Feb. 18, 1947. E. P. LAMB 2,415,893
POWER SHAFT COUPLING STRUCTURE
Filed July 1, 1944
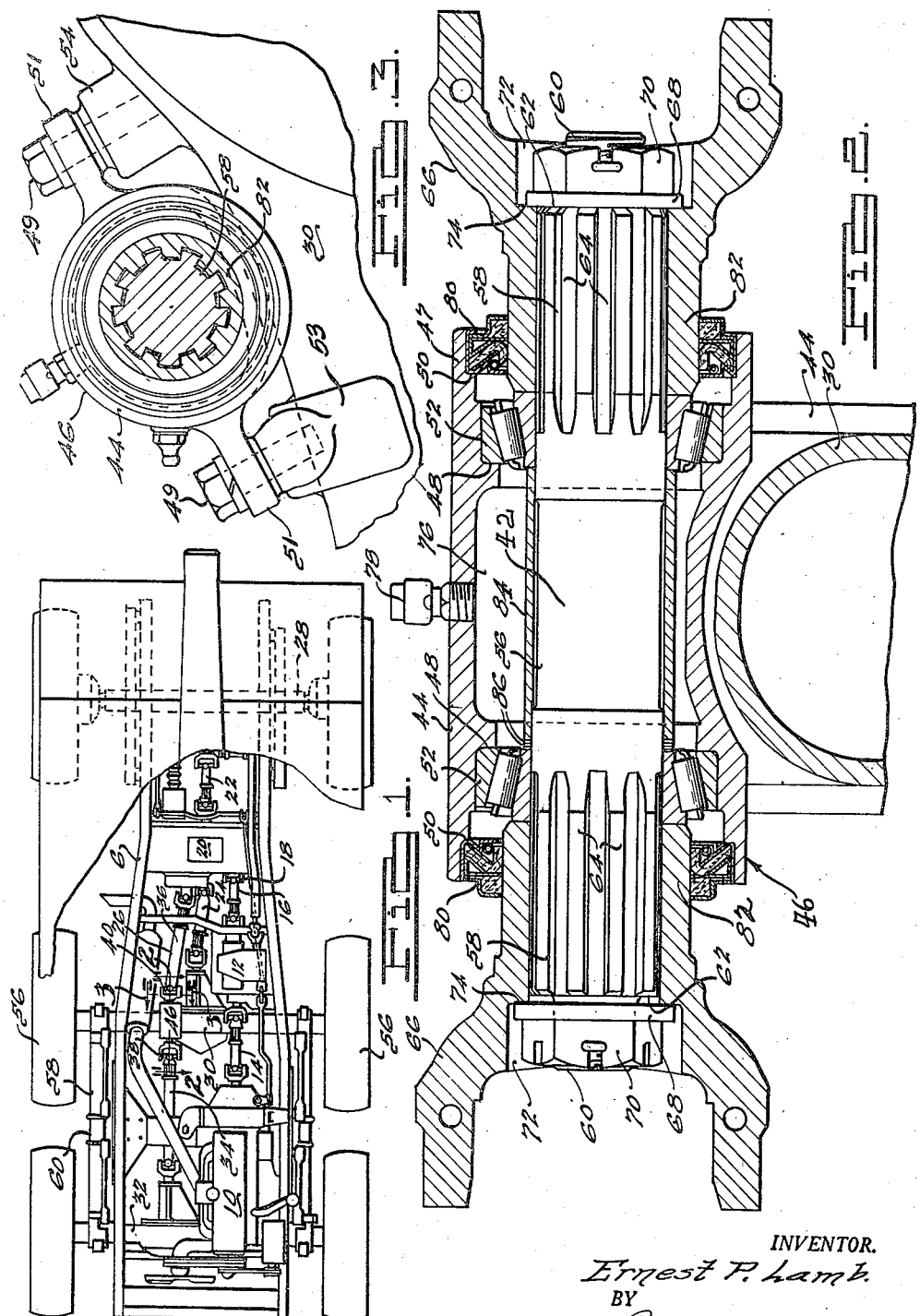
INVENTOR.
Ernest P. Lamb.
BY
Harness & Harris
ATTORNEYS.

Patented Feb. 18, 1947

2,415,893

UNITED STATES PATENT OFFICE 2,415,893

POWER SHAFT COUPLING STRUCTURE

Ernest P. Lamb, Grosse Pointe, Mich., assignor to Chrysler Corporation, Highland Park, Mich., a corporation of Delaware Application July 1, 1944, Serial No. 543,096

2 Claims. (Cl. 180—22)

This invention relates to power shaft couplings and is particularly concerned with improvements in a power shaft coupling structure for drivingly connecting the propeller shaft sections of an armored car rear wheel drive.

In armored cars and trucks having multiple-wheel, for instance, six-wheel drives, power is conventionally transmitted from the engine to the transmission and from the latter to a gear transfer case from which propeller shafts emanate and extend to the various axles of the vehicle. Customarily, the transfer case is located forward of the rear axles of the vehicle and where, as in the present invention, it is desired to provide independent drives from the transfer case to each of the rear axles, it is essential that the propeller shaft-connecting the rear-rear axle by-pass the rear axle. In accomplishing this result it has been found expedient to construct the propeller shafting to the rear-rear axle in two sections, one connected to the transfer case by a universal joint, the other connected to the rear-rear axle by a universal joint, and the two sections connected by a coupling shaft structure also through universal joints.

It will be appreciated that the propeller shafts are necessarily located in a region crowded with other structural elements and it is therefore of utmost importance that the coupling be as simple as possible in construction and readily disassembled and reassembled in the location provided for it. In this connection it has heretofore been proposed to employ a coupling structure in which the coupling shaft had a central portion fixed endwise in a pillow block between spaced anti-friction bearings by a shoulder outwardly of one bearing and a nut drawn up against the other. The nut was not readily accessible. Each end of the shaft moreover, had a tapered portion to which a connecting member such as a clevis or yoke of a universal joint could be clamped. The construction was such that the shaft could only be disassembled in one direction and then only with great difficulty since it was necessary to remove the bearing clamping nut. Furthermore, the structural features of the shaft were such that it was best made as a forging thus adding substantially to the overall cost of the coupling.

Although delays due to the difficulties of assembly and disassembly may not always be disturbing in servicing armored vehicles at suitable stations equipped for that purpose, it will be understood that under emergency conditions requiring field servicing, time is of the essence and therefore any handicaps of disassembly as described above in connection with the coupling structure could be serious. Accordingly, it was desirable to improve this condition. Furthermore, due to the relative vertical movement between the chassis and axles and between the axles themselves when the road wheels go over surface irregularities the propeller shafts are subject to deflection during rotation which may induce whip. It is therefore also desirable to mount the coupling in a manner to keep this deflection to a minimum in order that whip of the propeller shaft be avoided.

I have discovered that the assembly difficulties may be overcome and simplification of construction and reduction in manufacturing cost of the coupling be simultaneously obtained by so arranging and constructing the coupling such that the shaft section thereof may be disassembled from and entirely removed from either end of its support merely by the unturning of a single nut which is readily accessible. Moreover, by securing the pillow block of my construction to the rear axle of the vehicle I secure a minimum change in angularity between the propeller shaft sections and thereby inhibit the dangers of shaft whip in operation.

Accordingly, it is the general object of my invention to provide a power coupling structure for the rear-rear propeller shaft of a multi-wheel drive that is readily accessible, easily disassembled, and reassembled and that is simple in construction and inexpensive to manufacture.

Another object is to provide a power shaft coupling structure for connecting two propeller shaft sections of a multi-wheel power drive, the shaft section of which may be easily disassembled from either end of its bearing support.

A further object is to provide a power shaft coupling that may be disassembled from either end of its bearing support by merely unturning a single nut, readily accessible to the mechanic.

A further object is to provide a power shaft coupling structure in which the shaft section thereof may be produced from bar stock as distinguished from a forging.

Still another object is to provide a power transmitting propeller shaft for connecting the rear-rear axle of a multi-wheel drive from the gear transfer case of the vehicle, the said shaft including a coupling structure for the sections thereof supported from the rear axle whereby to reduce whipping tendencies of the shaft in rotational operation thereof.

Other objects and advantages of my invention will become more apparent from the following description taken in connection with the accompanying drawing wherein:

Fig. 1 is a plan view of a six-wheel drive armored car, most of the body being cut away to show the power plant and propeller shaft drives between the transfer case and the rear axles;

Fig. 2 is a longitudinal section of the power shaft coupling of my invention taken at 2—2 of Fig. 1; and Fig. 3 is a cross section taken at 3—3 of Fig. 1 showing the manner of securing the coupling structure of Fig. 2 to the rear axle of the vehicle.

Referring to the drawing, my invention is illustrated as embodied in an armored car having a six-wheel drive with independent propeller shaft connections between the transfer case and the respective rear axles. An engine 10 of any well known type transmits power to a conventional transmission 12 through a connecting input shaft 14. The output shaft 16 of the transmission drives the input member 18 of a transfer gear box 20 of well known construction secured to the chassis which in turn delivers power to propeller shafts 22, 24, and 26 drivingly connecting with the front, rear, and rear-rear axles 28, 30, and 32 respectively of the vehicle.

The rear-rear propeller shaft 26 as seen in Fig. 1 comprises sections 34 and 36 operably connected by universal joints 38 and 40 respectively to a third shaft section 42 (Fig. 2) carried in a pillow block 44 of my coupling structure generally designated by the numeral 46. The coupling structure as shown in Fig. 3 is mounted on the rear axle 30 by bolts 49 which pass through flanges 51 of the pillow block 44 and anchor in pads 53, 54 on the upper side of the axle 30 on which the coupling unit is seated. The stated arrangement makes it feasible to directly drivingly connect the transfer box and the rear-rear axle with a minimum of danger from whip by the shaft 26 in rotation. In this connection it will be observed that the road wheels 56 of the rear axles are supported by spring assemblies 58 through spring trunnion bearings 60 secured to the vehicle chassis 62. Accordingly angular deflections of the propeller shaft section 34 results only from differences in vertical displacement of the road wheels of the rear and rear-rear axles and in the case of the shaft section 36 from relative displacement between the rear axle and chassis.

A particular feature of the invention is the construction of the coupling unit 46 to enable easy and rapid disassembly of the coupling structure, and from either side of the rear axle. As shown in Fig. 2, the unit 46 comprises a supporting bracket or pillow block 44, the hollow cylindrical body portion 47 of which has a multi-step bore at each end forming the shoulders 48 and 50. Supported upon anti-friction roller thrust bearings 52 seated against the shoulders 48 at each end of the support 44 is a bar-like cylindrical shaft 42 having a central relieved portion 56 and outward portions 58 of similar construction, each of which terminates in a threaded portion 60 of reduced section forming a shoulder 62 with its respective portion 58. It will be noted that the portions 58 constitute the largest section of the shaft and therefore may be removed from either end of the pillow block through the inner race of the most remote thrust bearing 52.

Each portion 58 of the shaft 42 is externally splined as at 64 to non-rotatably and slidably mount a connection member for instance, a universal joint yoke or clevis 66 which is provided with mating splineways to receive the splines of the shaft 54 portion 58.

The yokes 66 are secured endwise on the shaft 54 by means of washers or collars 68 and stop or locking means, for instance nuts 70, the latter being threadedly received over the threaded portions 60 of the shaft 42. Each yoke 66 is recessed as at 72 to receive the nut and washer and to provide for reception of a socket wrench. Moreover, a shoulder 74 is provided against which the washers 68 are seated.

The pillow block 44 is provided with an oil-receiving cavity 76 surrounding the shaft 42 into which oil may be admitted through the oil cup 78. Suitable oil seals 80 are located between the wall of the body portion 47 of the pillow block 44 and the outer surface of the hubs 82 of the universal joint yokes 66 to prevent leakage.

It will be observed that assembly of the coupling structure is quite simple since all the elements assembled on the shaft 42 are held clamped between the end nuts 70, a spacing tube 84 with or without spacing shims 86 being provided to properly space the bearings 52 and to prevent cramping between the inner and outer races of the bearings. Thus the unit may be assembled by slipping one yoke 66, for instance, the right hand yoke in Fig. 2 over the shaft 42, the yoke 66 carrying a sealing ring 80 and drawing the washer 68 at this end against the shoulder 62 by a nut 70. The opposite end of the shaft 42 may then be passed through the bore of the inner race of a bearing 52 previously seated in the right hand end of the pillow block and the necessary bearing spacing tube with or without shims be then passed over the left hand end of the shaft. Alternatively, a similar procedure may be followed but the bearing and spacing elements be first assembled on the shaft and the shaft be then assembled through the bore of the pillow block with the bearing 52 seated against the right hand shoulder 48. Following either of the foregoing steps the left hand bearing 52 may be slipped over the left hand end of shaft 42 and assembled in place over the portion 58 of the shaft at that end and against the left hand seat 48 of the pillow block, this being followed by the left hand yoke 66 and seal 80 and by the washer 68 and nut 70 to complete the assembly. It will be noted that the distance between the shoulders 74 of the two end yokes is greater than that between the shoulders 62 of the shaft. Accordingly, when the left hand end nut is drawn up, pressure will be transmitted through the yokes, bearings and spacing means to the other nut, and all parts will be adequately held in position. Suitable locking means may be provided for the nuts 70 to prevent loosening thereof.

When it is desired to disassemble the unit, it is merely necessary to unturn either end nut and push the shaft in the opposite direction.

By using the shims 86 the distance between the bearings 52 and the length of the spacing tube 84 need not be held to close tolerances in manufacture, it being merely necessary to measure the distance between the shoulders 48 and make up the proper spacing means by use of the tube 84 and shims 86.

From the foregoing description it will be seen that I have provided a novel propeller shaft drive from the transfer case to the rear-rear axle of a multi-drive vehicle and a simple and effective coupling for the several sections of such drive that will permit easy and rapid disassembly and reassembly in the field.

While the particular structure described is well adapted for carrying out the objects of the invention, it will be understood that various modifications, changes and substitutions may be made without departing from the spirit thereof. Furthermore, the various features disclosed and described may be combined in ways other than those shown without departing from the present teachings. The present invention is therefore to be construed to include all such modifications, changes, and substitutions as may come within the scope of the following claims.

I claim:

1. A power shaft coupling unit comprising a support member, a pair of spaced anti-friction bearings carried by said support member, a shaft rotatably supported in said bearings and positioned to have a freely overhanging cylindrical portion outwardly of each bearing, said cylindrical portions being of substantially the same diameter and constituting the greatest transverse dimension of said shaft, spacing means comprising a sleeve on said shaft for maintaining said bearings in predetermined spaced relationship, a drive connection element non-rotatably mounted on each of said cylindrical shaft portions and axially slidable thereon, and removable, adjustable, threaded locking means secured adjacent each end of said shaft for securing said spacing means, bearings, and connection members in predetermined axial relation on said shaft by pressure transmitted by said locking means to each thereof.

2. In combination with an automotive vehicle having a gear transfer box, a plurality of rear axles, adapted for drive connection with said box, a multiple section propeller shaft for drivingly connecting said box with the rearwardmost of said rear axles, and a housing for the foremost of said rear axles; a coupling unit for connecting the sections of said shaft, said unit including a pillow block releasably secured to the said housing, a pair of spaced anti-friction bearings carried by said pillow block, a coupling shaft extending longitudinally of the vehicle and rotatably supported by said bearings, said shaft having a freely overhanging cylindrical extension outwardly of each bearing, annular spacing means removably carried by said coupling shaft and extending between said bearings to space the same, a universal connection member non-rotatably and slidably mounted on each said extensions for drivingly connecting with said propeller shaft sections, and a removable nut threadedly secured to each end of said coupling shaft for axially retaining said connection members thereto, said nuts being adapted to apply clamping pressure to said connection members, bearings and spacing means, and the transverse dimensions of said coupling shaft where it passes through said bearings being the greatest cross-sectional dimension of said shaft whereby said shaft may be disassembled from a connecting member by unturning the nut retaining said connection member to said shaft and displacing said shaft axially in the direction of the other connection member.

ERNEST P. LAMB.

REFERENCES CITED

The following references are of record in the file of this patent:

UNITED STATES PATENTS

| Number | Name | Date |
| --- | --- | --- |
| 2,168,970 | Buckendale | Aug. 8, 1939 |
| 2,158,320 | Bock | May 16, 1939 |
| 1,742,825 | Sanders et al. | Jan. 7, 1930 |
| 2,199,089 | Frank | Apr. 30, 1940 |